US007199361B2

(12) United States Patent
Bloomfield et al.

(10) Patent No.: US 7,199,361 B2
(45) Date of Patent: Apr. 3, 2007

(54) BROAD ION FRAGMENTATION COVERAGE IN MASS SPECTROMETRY BY VARYING THE COLLISION ENERGY

(75) Inventors: Nic Bloomfield, Toronto (CA); Yves LeBlanc, Toronto (CA)

(73) Assignee: MDS Inc., Concord, ON (CA)

( * ) Notice: Subject to any disclaimer, the term of this patent is extended or adjusted under 35 U.S.C. 154(b) by 0 days.

(21) Appl. No.: 10/425,190

(22) Filed: Apr. 28, 2003

(65) Prior Publication Data

US 2004/0041090 A1 Mar. 4, 2004

Related U.S. Application Data

(60) Provisional application No. 60/376,352, filed on Apr. 29, 2002.

(51) Int. Cl.
*H01J 49/00* (2006.01)
*B01D 59/44* (2006.01)

(52) U.S. Cl. ...................... 250/282; 250/281; 250/299; 250/300; 250/423 R

(58) Field of Classification Search ................ 250/281, 250/282, 299, 300
See application file for complete search history.

(56) References Cited

U.S. PATENT DOCUMENTS

| | | | | |
|---|---|---|---|---|
| 4,234,791 | A * | 11/1980 | Enke et al. | 250/281 |
| 4,861,988 | A | 8/1989 | Henion et al. | |
| 4,963,736 | A | 10/1990 | Douglas et al. | |
| 5,248,875 | A | 9/1993 | Douglas et al. | |
| 6,015,972 | A * | 1/2000 | Hager | 250/282 |
| 6,111,250 | A | 8/2000 | Thomas et al. | |
| 6,140,638 | A | 10/2000 | Tanner et al. | |
| 6,177,668 | B1 | 1/2001 | Hager | |
| 6,720,554 | B2 * | 4/2004 | Hager | 250/282 |
| 2003/0122071 | A1 * | 7/2003 | Plomley et al. | 250/292 |
| 2003/0168589 | A1 * | 9/2003 | Hager | 250/282 |
| 2003/0189168 | A1 * | 10/2003 | Londry et al. | 250/282 |
| 2003/0189171 | A1 * | 10/2003 | Londry et al. | 250/292 |
| 2005/0277789 | A1 * | 12/2005 | Bloomfield et al. | 564/4 |

FOREIGN PATENT DOCUMENTS

WO WO 00/33350 6/2000

OTHER PUBLICATIONS

Haller et al., Collision Induced Decomposition of Peptides. Choice of Collision Parameters *J. Am. Soc. Mass Spectrum 1996*, 7, 677-681.

* cited by examiner

*Primary Examiner*—Nikita Wells
(74) *Attorney, Agent, or Firm*—Torys LLP; Matthew Marquardt; Mary Anne Amoldo

(57) ABSTRACT

In the field of mass spectrometry, a method of obtaining a mass spectrum enriched with fragment ions while retaining the precursor ion. The technique includes varying the collision energy experienced by the precursor ion such that a range of fragmentations occur. Related methods are also disclosed for obtaining MS, $MS^2$, $MS^3$ and $MS^n$ spectra which are enriched with fragment ions.

22 Claims, 3 Drawing Sheets

BROAD ION FRAGMENTATION COVERAGE IN MASS SPECTROMETRY BY VARYING THE COLLISION ENERGY

This application claims priority to co-pending provisional patent application Ser. No. 60/376,352 filed Apr. 29, 2002, incorporated herein by reference.

FIELD OF INVENTION

The invention relates to mass spectrometers, and more particularly to a mass spectrometer capable of obtaining improved ion fragmentation spectra.

BACKGROUND OF INVENTION

Mass spectrometry techniques typically involve the detection of ions that have undergone physical change(s) in a mass spectrometer. Frequently, the physical change involves fragmenting a selected precursor ion and recording the mass spectrum of the resultant fragment ions. The information in the fragment ion mass spectrum is often a useful aid in elucidating the structure of the precursor ion. The general approach used to obtain a mass spectrometry/mass spectrometry (MS/MS or $MS^2$) spectrum is to isolate a selected precursor ion with a suitable m/z analyzer, to subject the precursor ion to energetic collisions with a neutral gas in order to induce dissociation, and finally to mass analyze the fragment ions in order to generate a mass spectrum.

Triple quadrupole mass spectrometers (TQMS) accomplish these steps through the use of two quadrupole mass analyzers separated by a pressurized reaction region for the fragmentation step, called the collision cell. For a sample mixture, the first quadrupole mass analyzer selectively transmits ion(s) of interest, or precursor ions, into a collision cell containing a background inert gas. Fragments are produced through collision induced dissociation (CID) upon collision with the neutral gas atoms or molecules. The fragments are then transmitted and mass analyzed in a third quadrupole mass analyzer. Chemical information, including the structure of the precursor ion, can be derived from these fragments.

The nature of fragmentation of the precursor ion selected from the first mass analyzer is dependent on the collision energy (CE) experienced by the precursor ion within the collision cell. The CE is a function of the momentum, or injection energy, that the ion possesses upon entering the collision cell and the background gas pressure inside of the collision cell.

In order to obtain more information from a precursor ion, an additional stage of MS can be applied to the MS/MS scheme outlined above, giving MS/MS/MS or $MS^3$. For example, the collision cell can be operated as an ion trap wherein the fragment ions are resonantly excited to promote further collision induced dissociation.

See, for example, WO 00/33350 by Douglas et al. published Jun. 8, 2000. In this case, the third quadrupole set functions as a mass analyzer to record the resulting fragmentation spectrum.

In the MS/MS and $MS^3$ techniques, the optimal collision energy is selected based on the charge state and mass of the precursor ion. See, for example, Haller et al., *J Am. Soc. Mass Spectrum* 1996, 7, 677–681. Although this information is theoretically known, it can be difficult to approximate the optimum collision energy and several attempts may often be necessary to produce a useful spectrum, at the expense of time and ion samples. If too high of a collision energy is used, an abundance of unnecessary fragmentations may be produced with subsequent annihilation of the precursor ion. The retention of the precursor ion in the resultant spectrum may be a useful reference ion.

The common use of mass analyzers to select precursor ions from a mixture of ions before the fragmentation step has improved the resolution of the resultant mass spectra. However, the high discrimination in the selection of a precursor ion, coupled with an optimal collision energy chosen for fragmentation of the precursor ion, may result in spectra that is oversimplified and therefore lacking useful information.

SUMMARY OF INVENTION

Generally speaking, the invention relates to a system and method of obtaining relatively broad fragmentation coverage of a precursor ion by varying the collision energy (CE) experienced by said ion. Instead of a fixed CE, where one value is used, a range or spread of CE values is used. The techniques can be conducted such that a broad range of fragment ions is produced whilst still retaining precursor ions.

According to one aspect of the invention, there is provided a method of fragmenting ions. The method includes (a) generating a stream of ions; (b) injecting the stream into a collision cell over a period of time, to thereby promote fragmentation; and (c) varying the collision energy experienced by the stream during injection into the collision cell. The collision energy may be varied over a predetermined energy range, which may be selected by the user. Alternatively, the user may select a nominal collision energy and a useful deviation plus or minus of the nominal. The collision energy may be varied continuously or discretely over a period of time.

In a preferred embodiment, the collision energy is varied by varying the momentum by which the ions are introduced into the cell. This can be accomplished by varying a voltage potential applied to the ions in order to inject them into the cell. Alternatively, the momentum can be varied by varying a pressure gradient experienced by the ions upstream of the collision cell.

Alternatively, the collision energy may be controlled by varying the background gas pressure in the collision cell over a period of time, whilst keeping the voltage potential or upstream pressure gradient constant. This technique is not presently preferred because of the practical difficulties in varying pressure over very short time frames.

According to another aspect of the invention, a quadrupole mass spectrometer is provided which includes at least first and second quadrupole rod sets arranged in linear formation and a mass analyzer operatively coupled to the second rod set. The first quadrupole rod set is configured for isolating selected ions. The second quadrupole rod set is enclosed within a collision chamber having a background gas pressure significantly higher than the first rod set. Means are provided for varying the voltage potential between the first rod set and second rod set (or chamber) so as to vary the injection energy applied to ions streaming into the collision chamber, to thereby vary the collision energy experienced by the ions. The mass analyzer may be a time-of-flight (TOF) device, a magnetic sector device, a quadruple mass filter, linear ion trap, or other means for obtaining a mass spectrum.

According to yet another aspect of the invention, a quadrupole mass spectrometer is provided which includes first, second and third quadrupole rod sets arranged in linear formation. The first quadrupole rod set is configured for isolating selected ions. The second quadrupole rod set is enclosed within a collision chamber having a background gas pressure significantly higher than the first and third rod sets. The third quadrupole rod set is configured as a linear ion trap. Means are provided for varying the voltage potential between the first and second rod sets (or chamber) so as to vary the injection energy applied to ions streaming into the collision chamber, to thereby vary the collision energy experienced by the ions.

BRIEF DESCRIPTION OF DRAWINGS

The foregoing and other aspects of the invention will become more apparent from the following description of specific embodiments thereof and the accompanying drawings which illustrate, by way of example only and not intending to be limiting, the principles of the invention. In the drawings.

DETAILED DESCRIPTION OF ILLUSTRATIVE EMBODIMENTS

Figure 1:
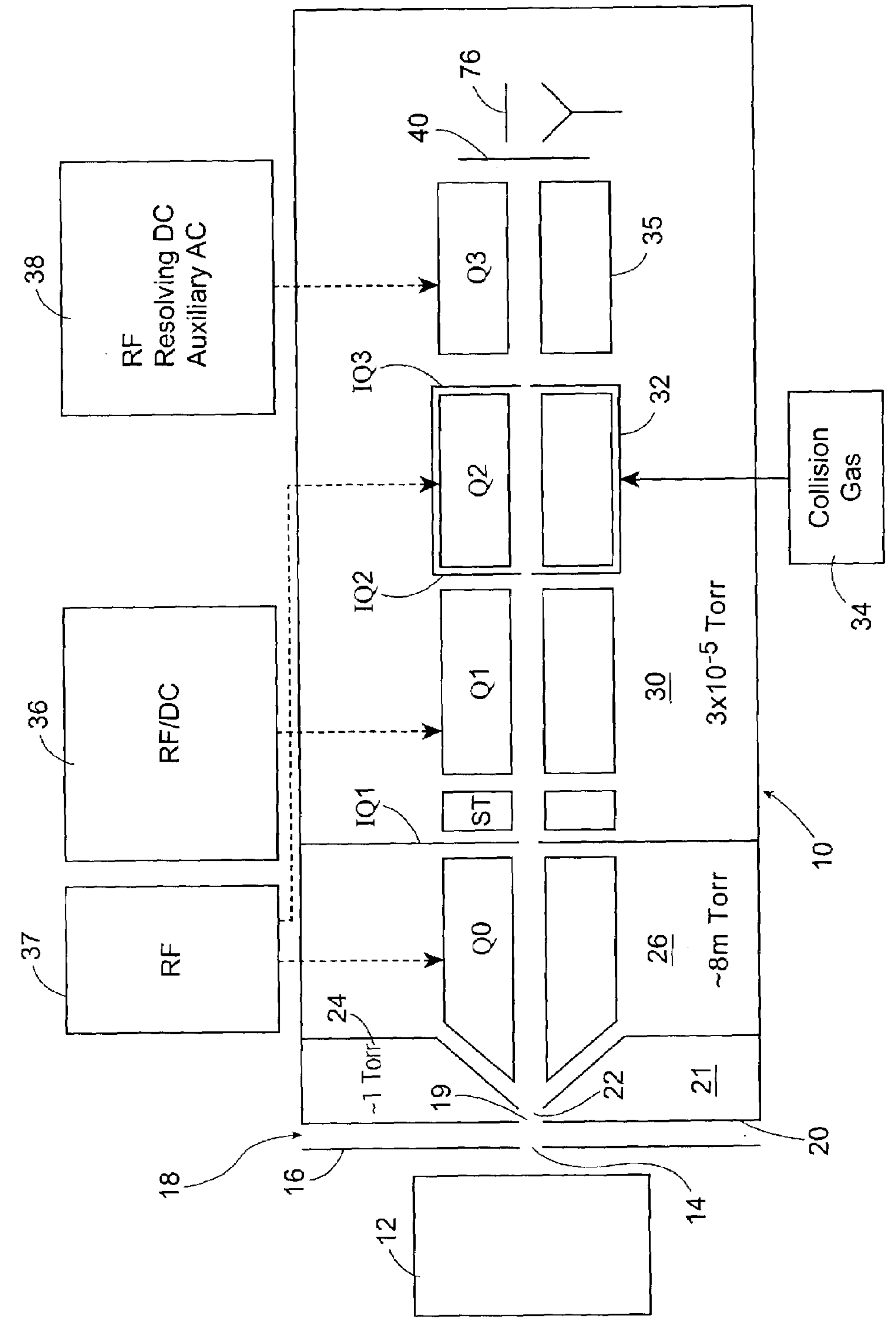
FIG. 1 is a system block diagram of a mass spectrometer in accordance with a first embodiment.

FIG. 1 illustrates a mass spectroscopy apparatus 10 in accordance with a first embodiment. In a known manner, the apparatus 10 includes an ion source 12, which may be an electrospray, an ion spray, a corona discharge device or any other known ion source. Ions from the ion source 12 are directed through an aperture 14 in an aperture plate 16. On the other side of the plate 16, there is a curtain gas chamber 18, which is supplied with curtain gas from a source (not shown). The curtain gas can be argon, nitrogen or other inert gas, such as described in U.S. Pat. No. 4,861,988, to Cornell Research Foundation Inc., which also discloses a suitable ion spray device. The contents of this patent are incorporated herein by reference.

The ions pass through an orifice 19 in an orifice plate 20 into a differentially pumped vacuum chamber 21. The ions then pass through aperture 22 in a skimmer plate 24 into a second differentially pumped chamber 26. Typically, the pressure in the differentially pumped chamber 21 is of the order of 1 or 2 Torr and the second differentially pumped chamber 26, often considered to be the first chamber of the mass spectrometer, is evacuated to a pressure of about 7 or 8 mTorr.

In the chamber 26, there is a conventional RF-only multipole ion guide Q0. Its function is to cool and focus the ions, and it is assisted by the relatively high gas pressure present in chamber 26. This chamber 26 also serves to provide an interface between the atmospheric pressure ion source 12 and the lower pressure vacuum chambers, thereby serving to remove more of the gas from the ion stream, before further processing.

An interquad aperture IQ1 separates the chamber 26 from a second main vacuum chamber 30. In the second chamber 30, there are RF-only rods labeled ST (short for "stubbies", to indicate rods of short axial extent), which serve as a Brubaker lens. A quadrupole rod set Q1 is located in the vacuum chamber 30, which is evacuated to approximately 1 to $3\times10^{-5}$ Torr. A second quadrupole rod set Q2 is located in a collision cell 32, supplied with collision gas at 34. The collision cell 32 is designed to provide an axial field toward the exit end as taught by Thomson and Jolliffe in U.S. Pat. No. 6,111,250, the entire contents of which are incorporated herein by reference. The cell 32 is within the chamber 30 and includes interquad apertures IQ2, IQ3 at either end, and typically is maintained at a pressure in the range $5\times10^{-4}$ to $8\times10^{-3}$ Torr, and more preferably to a pressure of about $5\times10^{-3}$ Torr. Following Q2 is located a third quadrupole rod set Q3, indicated at 35, and an exit lens 40. Opposite rods in Q3 are preferably spaced apart approximately 8.5 mm, although other spacings are contemplated and used in practice. The pressure in the Q3 region is nominally the same as that for Q1, namely 1 to $3\times10^{-5}$ Torr. A detector 76 is provided for detecting ions exiting through the exit lens 40.

Power supplies 37, for RF, 36, for RF/DC, and 38, for RF/DC and auxiliary AC are provided, connected to the quadrupoles Q0, Q1, Q2, and Q3. Q0 is operated as an RF-only multipole ion guide QO whose function is to cool and focus the ions as taught in U.S. Pat. No. 4,963,736, the contents of which are incorporated herein by reference. Q1 is a standard resolving RF/DC quadrupole. The RF and DC voltages are chosen to transmit only precursor ions of interest or a range of ions into Q2. Q2 is supplied with collision gas from source 34 to dissociate or fragment precursor ions to produce a 1st generation of fragment ions. A DC voltage is also applied (using one of the aforementioned power sources or a different source) on the plates IQ1, IQ2, IQ3 and the exit lens 40. The output of power supplies 36, 37 and/or 38, and/or the voltage applied to the plates, may be varied in order to vary the injection energy of the precursor ions as they enter Q2, as discussed in greater detail below. Q3 is operated as a linear ion trap which may be used to trap and scan ions out of Q3 in a mass dependent manner using an axial ejection technique.

In the illustrated embodiment, ions from ion source 12 are directed into the vacuum chamber 30 where, if desired, a precursor ion m/z (or range of mass-to-charge ratios) may be selected by Q1 through manipulation of the RF+DC voltages applied to the quadrupole rod set as well known in the art. Following precursor ion selection, the ions are preferably accelerated into Q2 by a suitable voltage drop between Q1 and IQ2, thereby inducing fragmentation as taught by U.S. Pat. No. 5,248,875, the contents of which are hereby incorporated by reference. A DC voltage drop of approximately 0 to 150 volts is present between Q1 and IQ2, depending on the injection energy.

The degree of fragmentation can be controlled in part by the pressure in the collision cell, Q2, and the voltage difference between Q1 and IQ2. In the preferred embodiment, the DC voltage difference between Q1 and IQ2 is varied in order to vary the injection energy applied to the precursor ions. Alternatively, the DC voltage between Q1 and Q2, IQ1 and IQ2, IQ1 and Q1, Q0 and IQ1 may be varied to vary the injection energy applied to the precursor ions. Similarly, a tapered rod set can be employed to vary the injection energy, depending on the degree of taper. Other means are also possible for varying the voltage applied to the ion stream as it is injected into the collision cell.

The voltage is preferably ramped in discrete steps over a pre-selected energy range, over a pre-determined period of time. The energy is typically expressed in electron-volts (eV), and a typical spread can be about 50 eV, although lower spreads, such as 20 eV, or higher spreads may be used in practice. The DC voltage difference between Q1 and IQ2 is preferably controlled to provide the desired energy range, and thus the change in voltage is dependant on the mass and charge state of the precursor ion. A software program is preferably employed to execute these calculations in order to determine voltage ranges and control the power sources which apply the DC potential on IQ2. The voltage range may be applied discretely, in step wise fashion. For example, for an injection time of 50 ms over a 50 eV CE spread, the voltage can be controlled to increase the CE by 10 eV every 10 ms. Alternatively, the voltage may be continuously varied over a 50 eV range over 50 ms. A linear, geometric, parabolic or other profile may be used in this respect.

In a preferred embodiment, the collision energy spread is preferably a user-entered specification. Preferably, the software calculates the optimal collision energy, as known in the art, and the user enters a deviation therefrom, e.g., plus or minus a certain percentage. Alternatively, the user may enter the range of collision energies.

In addition, or in the alternative to varying the voltage, the momentum imparted to the precursor ions may be varied by changing the pressure gradient experienced by the ions between Q0 and Q1. Alternatively, the collision energy may be varied by varying the background gas pressure in the collision cell 32. These methods are not presently preferred, however because of the practical difficulties in providing and controlling rapid pressure changes over very short periods of time.

The 1st generation of fragment ions along with non-dissociated precursor ions are carried into Q3 as a result of their momentum and the ambient pressure gradient between Q2 and Q3. Further dissociation of the precursor ions and/or 1st generation fragments may occur as taught in co-pending U.S. Ser. No. 09/864,878, filed Jul. 21, 2000 by Hager, the contents of which are incorporated herein by reference, although it should be appreciated that in the illustrated embodiment Q2 does not operate as a trap as taught in the Hager application. However, if desired, a suitable voltage drop, or gain, can be established between IQ3 and Q3 so as to minimize the kinetic energy by which the precursor and fragment ions enter Q3, thereby minimizing further dissociation. After a suitable fill time a blocking potential can be applied to IQ3 in order to trap the precursor ions and 1st generation fragments in Q3, which functions as a linear ion trap.

Once trapped in Q3, the precursor ions and 1st generation of fragment ions may be mass isolated again to select a specific m/z value or m/z range. If desired, the selected ions may be resonantly excited in the low pressure environment of Q3 to produce a 2nd generation of fragment ions (i.e., fragments of fragments) or selected precursor ions may be fragmented, as discussed in greater detail in co-pending provisional patent application U.S. Ser. No. 60/370,205, assigned to the instant assignee, the contents of which are incorporated herein by reference. Ions may be then mass selectively scanned out of the linear ion trap, thereby yielding an $MS^3$ or $MS^2$ spectrum, depending on whether the 1st generation fragments or the precursor ions are dissociated in Q3. It will also be appreciated that the cycle of trapping, isolating, and fragmenting can be carried out one or more times to thereby yield an $MS^n$ spectrum (where n>3).

The ions are axially scanned out of Q3 in a mass dependent manner preferably using an axial ejection technique as generally taught in U.S. Pat. No. 6,177,668, the contents of which are incorporated herein by reference. Briefly, the technique disclosed in U.S. Pat. No. 6,177,668 relies upon injecting ions into the entrance of a rod set, for example a quadrupole rod set, and trapping the ions at the far end by producing a barrier field at an exit member. An RF field is applied to the rods, at least adjacent to the barrier member, and the RF fields interact in an extraction region adjacent to the exit end of the rod set and the barrier member, to produce a fringing field. Ions in the extraction region are energized to eject, mass selectively, at least some ions of a selected mass-to-charge ratio axially from the rod set and past the barrier field. The ejected ions can then be detected. Various techniques are taught for ejecting the ions axially, namely scanning an auxiliary AC field applied to the end lens or barrier, scanning the RF voltage applied to the rod set while applying a fixed frequency auxiliary voltage to the end barrier and applying a supplementary AC voltage to the rod set in addition to that on the lens and the RF on the rods.

Every linear ion trap may have a somewhat different frequency for optimal axial ejection based on its exact geometrical configuration. A simultaneous ramping of the exit barrier, RF and auxiliary AC voltages increases the efficiency of axially ejecting ions, as described in greater detail in the co-pending provisional patent application U.S. Ser. No. 60/370,205.

Some experimental data using the aforementioned apparatus is now discussed with reference to FIGS. 2 and 3.

Figure 2:
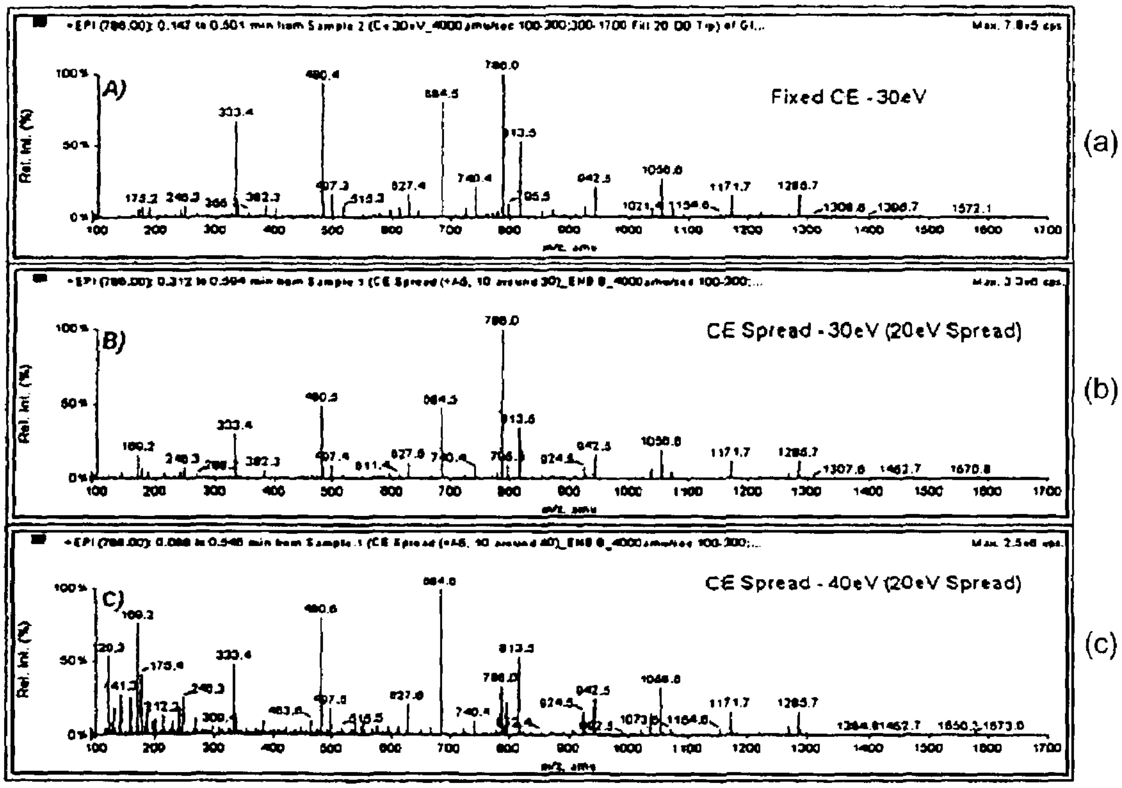
FIG. 2 is a spectral plot showing the fragmentation of Glu-Fibrinopeptide using a fixed CE versus a CE spread.

FIG. 2 shows the difference in fragmentation patterns when using a fixed CE value for the scan of Glu-Fibrinopeptide (m/z=1570.6) versus the use of CE spread. Two different center values were used for the CE spread approach. The spectrum in FIG. 2(*a*) shows a fixed CE at 30 eV, without CE spread. The other spectra show the use of a CE spread of 20 eV. In the spectrum of FIG. 2(*b*) a center value of 30 eV was used and the spectrum in FIG. 2(*c*) used a center value of 40 eV. In both FIGS. 2(*b*) and 2(*c*), it is apparent that more low and high mass ions are produced compared to the spectrum with the fixed CE. In both cases as well, there is residual precursor ion evident at m/z=1570.6, which serves as a useful reference and confirmation ion. Normally, at a CE value of 40 eV or above, the precursor ion would be completely fragmented. In addition to structure elucidation, this approach may be used for small molecule metabolism studies, and potentially quantitation studies in full scan mode.

Figure 3:
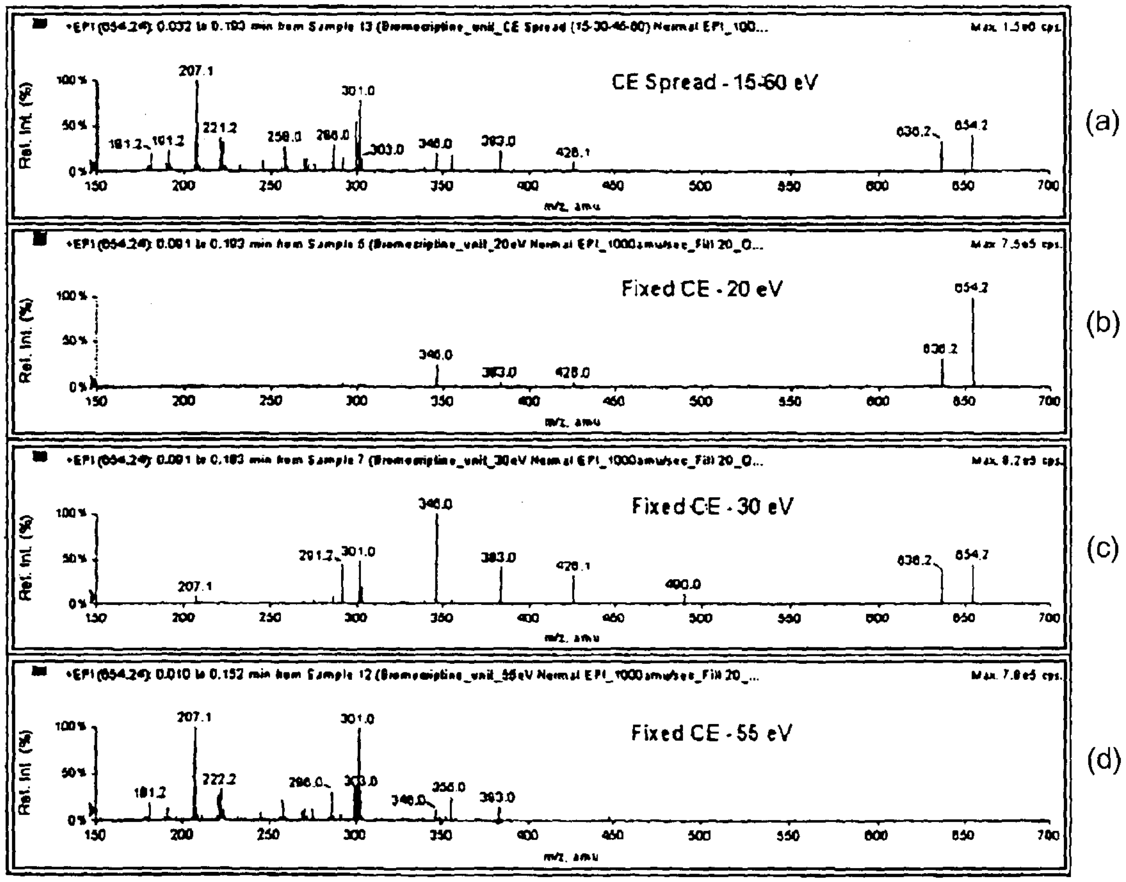
FIG. 3 is a spectral plot showing the fragmentation of bromocriptine using a series of fixed CE's versus CE spread.

FIG. 3 shows the spectrum of a CE spread as applied to the fragmentation of bromocriptine (m/z=654) in comparison with fixed CE spectra at various CE values.

FIG. 3(*a*) shows the spectrum with a spread of 15 to 60 eV. FIGS. 3(*b*), (*c*), and (*d*) show spectra with fixed CEs of 20 eV, 30 eV, and 55 eV respectively. It is apparent that as the fixed CE is increased, more low mass fragments are produced with the corresponding loss of the precursor ion (m/z=654) in FIG. 3(*d*). The CE spread spectrum shown in FIG. 3(*a*) provides the benefits of enriched fragmentation and retention of the precursor ion.

It will be understood that the CE spread approach may be applied to any mass spectrometry unit wherein ions are to be fragmented. For example, Q3 could be replaced by a time of flight (TOF) device, magnetic sector device, quadrupole mass filter or other such means for obtaining a mass spectrum.

It should also be understood that the neutral gas pressures and applied voltages are illustrative only and may be varied outside of the disclosed ranges or values without affecting the performance of the invention. None of the embodiments or operating parameters disclosed herein is intended to signify any absolute limits to the practice of the invention and the applicant intends to claim such operating parameters as broadly as permitted by the prior art. Those skilled in the art will appreciate that numerous other modifications and variations may be made to the embodiments disclosed herein without departing from the spirit of the invention.

The invention claimed is:

1. A method of fragmenting ions, comprising:

(a) generating a stream of ions;

(b) injecting said stream into a collision cell over a period of time, to thereby promote collision induced dissociation; and (c) varying the collision energy experienced by said stream over an energy range, discretely in stepwise fashion between a lowest value and a highest value at predetermined time intervals, during injection into said cell.

2. A method according to claim 1, wherein said collision energy is varied over a predetermined energy range.

3. A method according to claim 2, wherein said energy range is pre-selected by a user.

4. A method according to claim 2, wherein said energy range is determined through a user-selected nominal collision energy and a predetermined deviation.

5. A method according to claim 1, wherein said collision energy is varied by varying the momentum of the ions introduced into said cell.

6. A method according to claim 5, wherein said momentum is varied by varying a voltage potential experienced by said ions.

7. A method according to claim 6, wherein said voltage potential is varied over a predetermined energy range.

8. A method according to claim 7, wherein said energy range is pre-selected by a user.

9. A method according to claim 7, wherein said energy range is determined through a user-selected nominal voltage potential and a predetermined deviation.

10. A method according to claim 5, wherein said momentum is varied by varying a pressure gradient experienced by said ions upstream of said collision cell.

11. A method according to claim 10, wherein said pressure gradient is varied over a predetermined pressure range.

12. A method according to claim 11, wherein said pressure range is pre-selected by a user.

13. A method according to claim 11, wherein said pressure range is determined through a user-selected nominal pressure gradient and a predetermined deviation.

14. A method according to claim 1, wherein said collision energy is varied by varying the background gas pressure in said cell over said period of time.

15. A method according to claim 14, wherein said background gas pressure is varied over a predetermined pressure range.

16. A method according to claim 15, wherein said pressure range is pre-selected by a user.

17. A method according to claim 15, wherein said pressure range is determined through a user-selected nominal background gas pressure and a predetermined deviation.

18. Apparatus for fragmenting ions, comprising:

(a) means for generating a stream of ions;

(b) means for injecting said stream into a collision cell over a period of time, to thereby promote collision-induced dissociation of said ions; and (c) means for varying the collision energy experienced by said stream during injection into said cell by varying the momentum of the ions introduced into said cell.

19. Apparatus according to claim 18, wherein said momentum is varied by varying a voltage potential experienced by said ions.

20. Apparatus according to claim 19, wherein said voltage is varied over a pre-determined energy range.

21. A mass spectrometer, comprising:

(a) first and second quadrupole rod sets arranged in linear formation, the first rod set being controlled to isolate selected precursor ions, the second rod set being enclosed in a collision chamber having a background gas pressure significantly higher than the ambient environment of the first rod set;

(b) an ionization device for ionizing a substance and injecting a stream of ions into the first rod set;

(c) means for varying the voltage applied to the ion stream, discretely in stepwise fashion between a lowest value and a highest value at predetermined time intervals, as it is injected into the collision cell so as to vary the collision energy experienced by said ions over a pre-determined energy range; and (d) mass filter means for obtaining a mass spectrum from ions emanating from the second rod set.

22. A triple quadrupole mass spectrometer, comprising:

(a) first, second and third quadrupole rod sets arranged in linear formation, the first rod set being controlled to isolate selected precursor ions, the second rod set being enclosed in a collision chamber having a background gas pressure significantly higher than the ambient environment of the first and third rod sets, and the third rod set being controlled as a linear ion trap;

(b) an ionization device for ionizing a substance and injecting a stream of ions into the first rod set; and (c) means for varying the voltage applied to the ion stream, discretely in stepwise fashion between a lowest value and a highest value at predetermined time intervals, as it is injected into the collision cell so as to vary the collision energy experienced by said ions over a pre-determined energy range.

* * * * *